United States Patent
Tani et al.

(10) Patent No.: US 11,070,284 B2
(45) Date of Patent: Jul. 20, 2021

(54) TRANSMITTING STATION, CONTROL CIRCUIT, AND STORAGE MEDIUM

(71) Applicant: Mitsubishi Electric Corporation, Tokyo (JP)

(72) Inventors: Shigenori Tani, Tokyo (JP); Katsuyuki Motoyoshi, Tokyo (JP); Yasunori Noda, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/614,932

(22) PCT Filed: Jul. 13, 2017

(86) PCT No.: PCT/JP2017/025483
§ 371 (c)(1),
(2) Date: Nov. 19, 2019

(87) PCT Pub. No.: WO2019/012638
PCT Pub. Date: Jan. 17, 2019

(65) Prior Publication Data
US 2020/0186241 A1    Jun. 11, 2020

(51) Int. Cl.
*H04B 7/185*   (2006.01)
*H04B 17/318*  (2015.01)
*G01S 19/04*   (2010.01)
*G01S 19/07*   (2010.01)
*H01Q 21/24*   (2006.01)

(52) U.S. Cl.
CPC .......... *H04B 7/18543* (2013.01); *G01S 19/04* (2013.01); *G01S 19/07* (2013.01); *H01Q 21/24* (2013.01); *H04B 7/18534* (2013.01); *H04B 17/318* (2015.01)

(58) Field of Classification Search
CPC .... H04B 7/18543; H04B 10/564; H04B 1/02; H04B 7/0632; H04B 17/318
See application file for complete search history.

(56) References Cited

U.S. PATENT DOCUMENTS

| | | |
|---|---|---|
| 6,944,139 B1 | 9/2005 | Campanella |
| 2007/0129024 A1* | 6/2007 | Kikuma ............... H04B 7/0608 455/101 |
| 2009/0046008 A1 | 2/2009 | Murakami et al. |

FOREIGN PATENT DOCUMENTS

| | | |
|---|---|---|
| JP | 2002-508623 A | 3/2002 |
| JP | 2014-187688 A | 10/2014 |
| JP | 2015-84502 A | 4/2015 |

OTHER PUBLICATIONS

Partial Supplementary European Search Report, dated Jun. 9, 2020, for European Application No. 17917771.2.

(Continued)

*Primary Examiner* — Keith Ferguson
(74) *Attorney, Agent, or Firm* — Birch, Stewart, Kolasch & Birch, LLP.

(57) ABSTRACT

A transmitting station includes an amplifier unit that amplifies a transmitting signal, a transmitting antenna that wirelessly transmits the transmitting signal that has been amplified, and a controller unit that regulates a frequency of the transmitting signal and an input power to the amplifier unit on the basis of an estimation value of reception quality that is a signal quality when the transmitting signal is received by a receiving station.

3 Claims, 9 Drawing Sheets

(56) References Cited

OTHER PUBLICATIONS

Extended European Search Report for European Application No. 17917771.2, dated Sep. 15, 2020.
ETSI EN, "Digital Video Broadcasting (DVB); Second generation framing structure, channel coding and modulation systems for Broadcasting, Interactive Services, News Gathering and other broadband satellite applications; Part 1: DVB-S2", European Telecommunications Standards Institute Europian Standard, 302 307-1 V1.4.1, Nov. 2014, pp. 1-80.

* cited by examiner

FIG.13

TRANSMITTING STATION, CONTROL CIRCUIT, AND STORAGE MEDIUM

FIELD

The present invention relates to a transmitting station that transmits data as a radio signal, a receiving station, a control station, a data transmission system, and a control method for the data transmission system.

BACKGROUND

There has been developed a data transmission system intended to wirelessly transmit data acquired by an artificial satellite such as an observation satellite traveling in a low orbit around the Earth to a receiving station on the Earth. The low orbit is an orbit whose altitude is lower than a stationary orbit and generally corresponds to an orbit having an altitude less than or equal to 2000 km. With increasing precision of observation equipment mounted on the artificial satellite, an increasing amount of data is transmitted from the artificial satellite to the receiving station. Because of the increasing amount of data, a higher transmission rate is desired. The artificial satellite traveling in the low orbit is hereinafter abbreviated to "satellite".

As a method of increasing a transmission rate, there has been a method of increasing the number of multiple values for modulation and a code rate to increase frequency usage efficiency. However, the higher the number of multiple values for modulation and the code rate are, the more likely it is that the receiving station has failure in data identification, and a required value for reception quality that is a signal quality of a reception signal to be received by the receiving station becomes higher. In the data transmission system using a satellite, a distance and an elevation angle between the satellite and the receiving station on the Earth vary as the satellite moves, and the amount of attenuation in a transmission signal varies with time in a communication channel between the satellite and the receiving station, so that the reception quality varies with time. For this reason, adaptive modulation is used to change the number of multiple values for modulation, the code rate, and the like of a transmitting signal according to temporal change in the reception quality.

Non Patent Literature 1 discloses a communication system using an adaptive modulation method called Adaptive Coding and Modulation (ACM) or an adaptive modulation method called Variable Coding and Modulation (VCM). The communication system described in Non Patent Literature 1 enables data transmission to satisfy a desired error rate by decreasing the number of multiple values for modulation as the reception quality becomes lower and increasing the number of multiple values for modulation as the reception quality becomes higher.

CITATION LIST

Non Patent Literature

Non Patent Literature 1: European Telecommunications Standards Institute European Standard (ETSI EN) 302 307-1 V1.4.1, November 2014

SUMMARY

Technical Problem

In the communication system described in the above-mentioned Non Patent Literature 1, a symbol rate needs to be increased for further improvement of the transmission rate. To increase the symbol rate, a transmitting station needs to increase transmission power of a signal with an amplifier part being used to regulate the transmission power. However, the amount of attenuation in the transmitting signal in the communication channel between the satellite and the receiving station varies with time in association with a positional relation between the satellite and the receiving station. Therefore, if the elevation angle between the satellite and the receiving station becomes higher after determination of input power to the amplifier part, the transmission power may become surplus even with the adaptive modulation being performed, and the frequency usage efficiency and the power utilization efficiency problematically decrease.

The present invention has been made in view of the above circumstances, and its object is to provide a transmitting station that is capable of improving frequency usage efficiency and power utilization efficiency when transmitting data as a radio signal.

Solution to Problem

In order to solve the problems mentioned above and achieve the object, the present invention provides a transmitting station comprising: an amplifier unit to amplify a transmitting signal; a transmitting antenna to wirelessly transmit the transmitting signal that has been amplified; and a controller unit to regulate a frequency of the transmitting signal and an input power to the amplifier unit on the basis of an estimation value of reception quality that is a signal quality when the transmitting signal is received by a receiving station.

Advantageous Effect of Invention

The transmitting station according to the present invention has an advantageous effect in that frequency usage efficiency and power utilization efficiency can be improved when data is transmitted as a radio signal.

DESCRIPTION OF EMBODIMENTS

With reference to the drawings, a detailed description is hereinafter provided of a transmitting station, a receiving station, a control station, a data transmission system, and a control method for the data transmission system according to embodiments of the present invention. It is to be noted that these embodiments are not restrictive of the present invention.

First Embodiment

Figure 1:
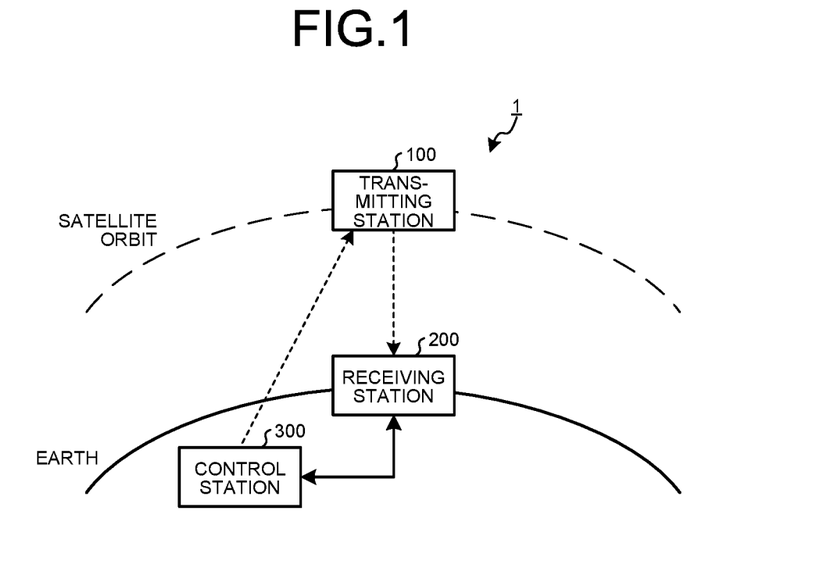
FIG. 1 is a diagram illustrating a configuration of a data transmission system according to a first embodiment of the present invention.

FIG. 1 is a diagram illustrating a configuration of a data transmission system 1 according to the first embodiment of the present invention. The data transmission system 1 includes a transmitting station 100, a receiving station 200, and a control station 300. The transmitting station 100 is mounted to a satellite traveling in a low orbit around the Earth. The receiving station 200 is a radio communication device installed on the Earth and receives, from the transmitting station 100, data collected by the satellite mounted with the transmitting station 100. The control station 300 is a radio communication device installed on the Earth, generates control information for controlling radio communication between the transmitting station 100 and the receiving station 200 and informs the transmitting station 100 and the receiving station 200 of the generated control information.

The transmitting station 100 can transmit data to the receiving station 200 by use of radio communication. The data that the transmitting station 100 transmits to the receiving station 200 is, for example, observation data that is collected by the observation satellite mounted with the transmitting station 100.

It is to be noted that a dotted line and a solid line connecting between blocks in FIG. 1 represent forms of connection. The dotted line represents wireless connection, while the solid line represents wired connection. In other words, in FIG. 1, the transmitting station 100 and the receiving station 200 are wirelessly connected, the transmitting station 100 and the control station 300 are wirelessly connected, and the receiving station 200 and the control station 300 are connected by wire. It is to be noted, however, that the receiving station 200 and the control station 300 may be connected wirelessly.

Figure 2:
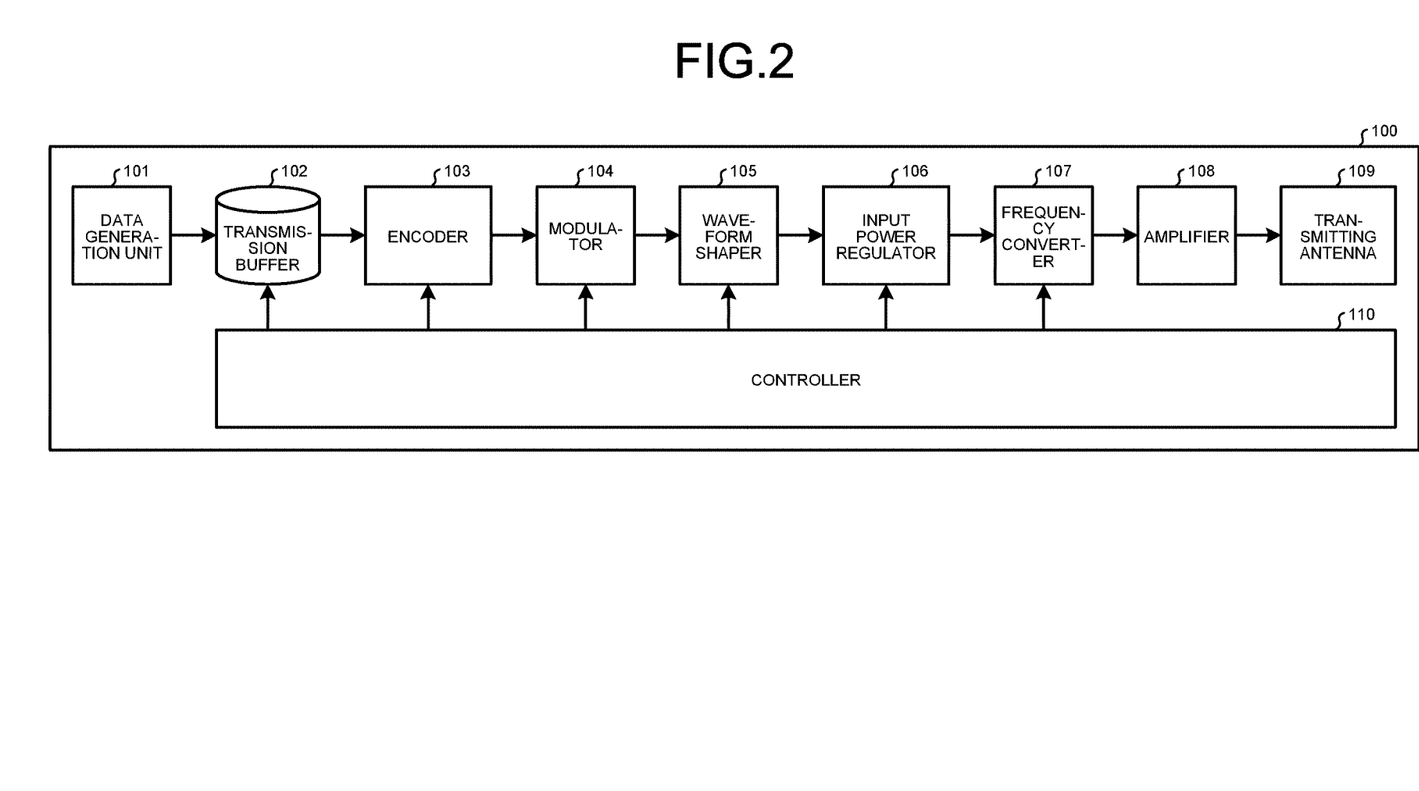
FIG. 2 is a diagram illustrating a functional configuration of a transmitting station illustrated in FIG. 1.

FIG. 2 is a diagram illustrating a functional configuration of the transmitting station 100 illustrated in FIG. 1. The transmitting station 100 includes a data generation unit 101, a transmission buffer 102, an encoder unit 103, a modulator unit 104, a waveform shaper unit 105, an input power regulator unit 106, a frequency converter unit 107, an amplifier unit 108, a transmitting antenna 109, and a controller unit 110.

The data generation unit 101 generates data to be transmitted, such as observation information, and stores the generated data in the transmission buffer 102. The transmission buffer 102 outputs the stored data to the encoder unit 103 at a data transfer rate specified from the controller unit 110. By changing the data transfer rate from the transmission buffer 102, a symbol rate is regulated, and a frequency of a transmitting signal is regulated. Therefore, the transmission buffer 102 is an example of a frequency regulator unit. The encoder unit 103 encodes the data outputted from the transmission buffer 102 in an encoding method specified from the controller unit 110. The encoder 103 outputs the encoded data to the modulator unit 104. It is to be noted that the encoding method involves an encoding type and a code rate. The modulator unit 104 modulates the data outputted by the encoder unit 103 in a modulation method specified from the controller unit 110. The modulator unit 104 outputs the modulated data to the waveform shaper unit 105.

The waveform shaper unit 105 shapes a waveform of the data outputted by the modulator unit 104 to be band-limited with a roll-off specified from the controller unit 110. The roll-off indicates a characteristic of a filter owned by the waveform shaper unit 105. When the roll-off is $\alpha$ ($0 \leq \alpha \leq 1$), a band is limited with $1+\alpha$ times that of an ideal rectangular filter having the symbol rate. The larger the roll-off is, the more gradual an amplitude change of a signal is, but the smaller the roll-off is, the steeper the amplitude change of the signal is. The smaller the roll-off is, the higher the frequency usage efficiency is, but the higher a required value for reception quality is. By changing the roll-off, the frequency of the transmitting signal is regulated. Therefore, the waveform shaper unit 105 is an example of the frequency regulator unit. The waveform shaper unit 105 outputs the shaped data to the input power regulator unit 106. The input power regulator unit 106 multiplies the data outputted by the waveform shaper unit 105 by a coefficient specified from the controller unit 110. The input power regulator unit 106 outputs the data obtained after the multiplication of the coefficient to the frequency converter unit 107. When the multiplication of the coefficient is performed by the input power regulator unit 106, the power of a signal to be inputted to the amplifier unit 108 is regulated. Therefore, the input power regulator unit 106 regulates the input power to the amplifier unit 108.

The frequency converter unit 107 converts the data outputted by the input power regulator unit 106 into a radio transmission frequency band signal using a frequency conversion amount specified from the controller unit 110. The frequency converter unit 107 outputs the signal obtained by the conversion to the amplifier unit 108. The amplifier unit 108 amplifies the power of the signal outputted by the frequency converter unit 107. The amplifier unit 108 outputs the amplified signal to the transmitting antenna 109. The transmitting antenna 109 transmits the signal outputted by the amplifier unit 108 as a radio signal.

The controller unit 110 receives the control information from the control station 300 and controls an operation of each of the units of the transmitting station 100 on the basis of the received control information. The control information includes one or more of the following: a data transfer amount to be specified to the transmission buffer 102, an encoding method to be specified to the encoder unit 103, a modulation method to be specified to the modulator unit 104, a filter roll-off to be specified to the waveform shaper unit 105, a coefficient to be specified to the input power regulator unit 106, and a frequency conversion amount to be specified to the frequency converter unit 107. The control information is instructional information on the frequency of the transmitting signal, the input power to the amplifier unit 108, and others for the transmitting station 100.

Upon receiving the control information from the control station 300, the controller 110 checks whether or not the control information includes information elements to be communicated respectively to the transmission buffer 102, the encoder unit 103, the modulator unit 104, the waveform shaper unit 105, the input power regulator unit 106, and the frequency converter unit 107. If the control information includes the information element to be communicated, the controller unit 110 controls, in accordance with the control information, at least one of the transmission buffer 102, the encoder unit 103, the modulator unit 104, the waveform shaper unit 105, the input power regulator unit 106, and the frequency converter unit 107. Such a configuration allows the controller 110 to adjust, for example, the data transfer rate of the transmission buffer 102, the encoding method to be used by the encoder unit 103, the modulation method to be used by the modulator unit 104, the roll-off of the waveform shaper unit 105, the coefficient to be used by the input power regulator unit 106, and the frequency conversion amount to be used by the frequency converter unit 107.

Figure 3:
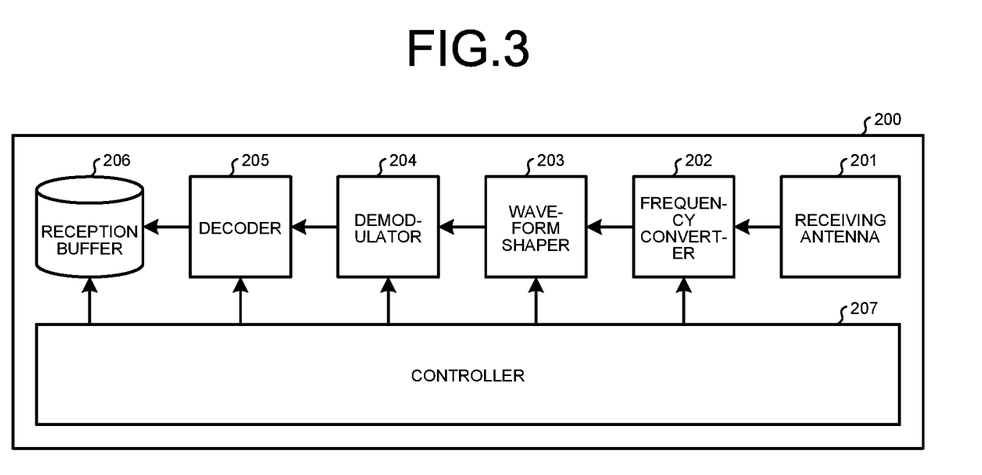
FIG. 3 is a diagram illustrating a functional configuration of a receiving station illustrated in FIG. 1.

FIG. 3 is a diagram illustrating a functional configuration of the receiving station 200 illustrated in FIG. 1. The receiving station 200 includes a receiving antenna 201, a frequency converter unit 202, a waveform shaper unit 203, a demodulator unit 204, a decoder unit 205, a reception buffer 206, and a controller unit 207.

The receiving antenna 201 receives a radio signal transmitted from the transmitting antenna 109 of the transmitting station 100. The receiving antenna 201 outputs the received signal to the frequency converter unit 202. The frequency converter unit 202 converts the signal outputted by the receiving antenna 201 into a frequency specified from the controller unit 207, and then performs conversion into an electrical signal and outputs it. The waveform shaper unit 203 shapes a waveform of the electrical signal outputted by the frequency converter unit 202 with a roll-off specified from the controller unit 207. The waveform shaper unit 203 outputs the waveform-shaped data to the demodulator unit 204.

The demodulator unit 204 demodulates the data outputted by the waveform shaper unit 203 in a demodulation method specified from the controller unit 207. The demodulator unit 204 outputs the data obtained after the demodulation to the decoder unit 205. The decoder unit 205 decodes the data outputted by the demodulator unit 204 in a decoding method specified from the controller 207, causes the reception buffer 206 to store the resultant decoded data therein.

The controller unit 207 receives the control information from the control station 300 and controls an operation of each of the units of the receiving station 200 on the basis of the received control information. The control information includes one or more of the following: a frequency to be specified to the frequency converter unit 202, a roll-off to be specified to the waveform shaper unit 203, a demodulation method to be specified to the demodulator unit 204, and a decoding method to be specified to the decoder unit 205.

Upon receiving the control information from the control station 300, the controller unit 207 checks whether or not the control information includes information elements to be communicated respectively to the frequency converter unit 202, the waveform shaper unit 203, the demodulator unit 204, and the decoder unit 205. If the control information includes the information element to be communicated, the controller 207 controls, in accordance with the control information, at least one of the frequency converter unit 202, the waveform shaper unit 203, the demodulator unit 204, and the decoder unit 205.

The control information includes information elements corresponding to the information elements to be communicated to the transmitting station 100. Therefore, the receiving station 200 can correctly receive the transmitting signal. The corresponding information element means an information element for enabling the receiving station 200 to normally handle the signal processed by the transmitting station 100. When an encoding method with a code rate of 0.5 is specified to the transmitting station 100, the corresponding information element corresponds to, for example, a decoding method in which the receiving station 200 can decode data having the code rate of 0.5. Moreover, the roll-off to be specified to the waveform shaper unit 203 of the receiving station 200 is adjusted to be identical with the roll-off specified to the waveform shaper unit 105 of the transmitting station 100.

Figure 4:
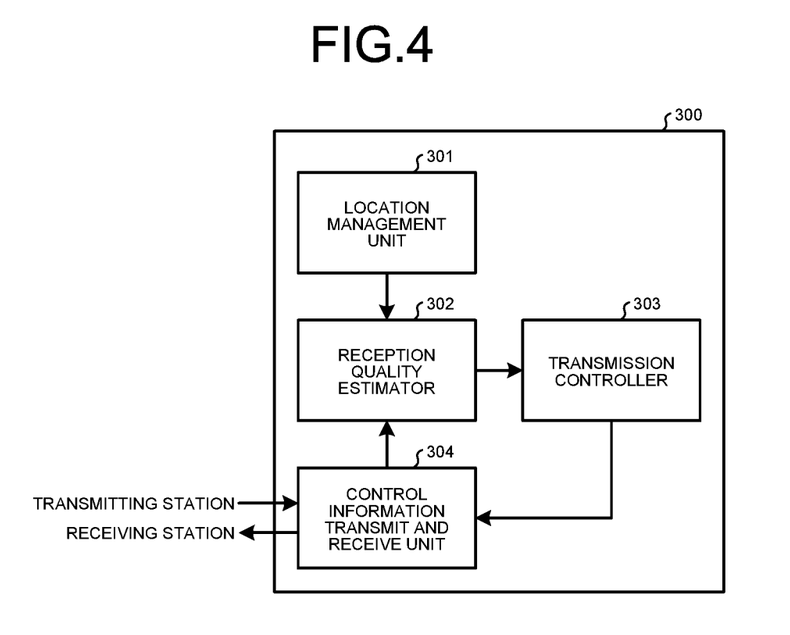
FIG. 4 is a diagram illustrating a functional configuration of a control station illustrated in FIG. 1.

FIG. 4 is a diagram illustrating a functional configuration of the control station 300 illustrated in FIG. 1. The control station 300 includes a location management unit 301, a reception quality estimator unit 302, a transmission controller unit 303, and a control information transmit and receive unit 304.

The location management unit 301 manages a location of the satellite mounted with the transmitting station 100 and a location of the receiving station 200. The location of the satellite changes with time, while the location of the receiving station 200 is fixed.

The reception quality estimator unit 302 estimates the reception quality when the receiving station 200 receives a signal transmitted by the transmitting station 100. The reception quality estimator unit 302 can estimate the reception quality using the locations of the transmitting station 100 and the receiving station 200 that are managed by the location management unit 301. An estimation value of the reception quality only has to be a value indicative of the reception quality and, for example, corresponds to an amount of attenuation or a signal level of a received signal. The estimation value of the reception quality is usually composed of two or more factors. The reception quality varies depending on, for example, an elevation angle of the transmitting station 100 as viewed from the receiving station 200, a rainfall condition in a place where the receiving station 200 is disposed, a directivity and a beam pattern of the transmitting antenna 109 equipped in the transmitting station 100, a transmission power of the transmitting station 100, a noise level specific to the receiving station 200, and others.

The reception quality estimator unit 302 calculates a distance between the transmitting station 100 and the receiving station 200 and uses the calculated distance to estimate distance attenuation of a signal, which occurs between the transmitting station 100 and the receiving station 200. Moreover, the reception quality estimator unit 302 uses the location of the receiving station 200, managed by the location management unit 301, to estimate the amount of rainfall attenuation of a signal. The reception quality estimator unit 302 can calculate the estimation value of the reception quality by taking into consideration the two or more factors. When the directivity and beam pattern of the transmitting antenna 109, the transmission power of the transmitting station 100, the noise level specific to the receiving station 200, and others are fixed, the reception quality estimator unit 302 can also use the elevation angle of the transmitting station 100 as viewed from the receiving station 200 as an estimation value of the reception quality. The reception quality estimator unit 302 calculates the estimation value of the reception quality and outputs the calculated estimation value to the transmission controller unit 303.

Alternatively, if the transmitting station 100 transmits a known signal on a regular basis, the reception quality estimator unit 302 can estimate the reception quality using a signal level of the known signal received by the receiving station 200.

The transmission controller unit 303 generates the control information to be communicated to the transmitting station 100 and the receiving station 200. The transmission controller unit 303 uses the reception quality estimation value outputted by the reception quality estimator unit 302 to select the information elements such as an appropriate modulation method and an appropriate code rate that satisfy a desired error rate. Details of a method in which the transmission controller unit 303 generates the control information are described later. The transmission controller unit 303 generates the control information including the selected information elements and outputs the generated control information to the control information transmit and receive unit 304.

The control information transmit and receive unit 304 transmits the control information outputted by the transmission controller unit 303 to each of the transmitting station 100 and the receiving station 200.

Figure 5:
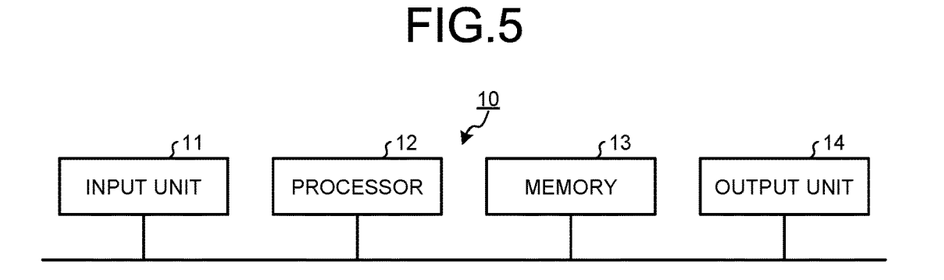
FIG. 5 is a diagram illustrating a control circuit intended to achieve functions of the transmitting station, receiving station, and control station illustrated in FIG. 1.

Now, description is provided for a hardware configuration intended to achieve functions of the transmitting station 100, the receiving station 200, and the control station 300. FIG. 5 is a diagram illustrating a control circuit 10 for realizing the functions the transmitting station 100, receiving station 200, and control station 300 illustrated in FIG. 1.

The control circuit 10 includes an input unit 11, a processor 12, a memory 13, and an output unit 14. The input unit 11 is an interface circuit that receives data inputted from outside of the control circuit 10 and outputs the data to the processor 12. The processor 12 is a central processing unit (CPU), which is also referred to as a central processor, a processing unit, an arithmetic unit, a microprocessor, a microcomputer, a digital signal processor (DSP), or the like. The memory 13 is, for example, a magnetic disk, or a nonvolatile or volatile semiconductor memory such as a random access memory (RAM), a read only memory (ROM), a flash memory, an erasable programmable ROM (EPROM), or an electrically EPROM (EEPROM). The output unit 14 is an interface circuit that outputs data from the processor 12 or the memory 13 to the outside of the control circuit 10.

The processor 12 can implement each of the functions of the transmitting station 100, the receiving station 200, and the control station 300 by reading and executing a computer program stored in the memory 13. The memory 13 is also used as a temporary memory in each process that is executed by the processor 12.

Not only the above-described control circuit 10 but also dedicated hardware can be used to achieve the functions of the transmitting station 100, the receiving station 200, and the control station 300. The dedicated hardware is, for example, a single circuit, a composite circuit, a programmed processor, a parallel programmed processor, an application specific integrated circuit (ASIC), a field-programmable gate array (FPGA), or any combination of these.

Each of the units of the transmitting station 100, the receiving station 200, and the control station 300 may be functionally configured by use of their respective separate circuits or devices, or a plurality of functional units may be configured by use of a single circuit or device.

Figure 6:
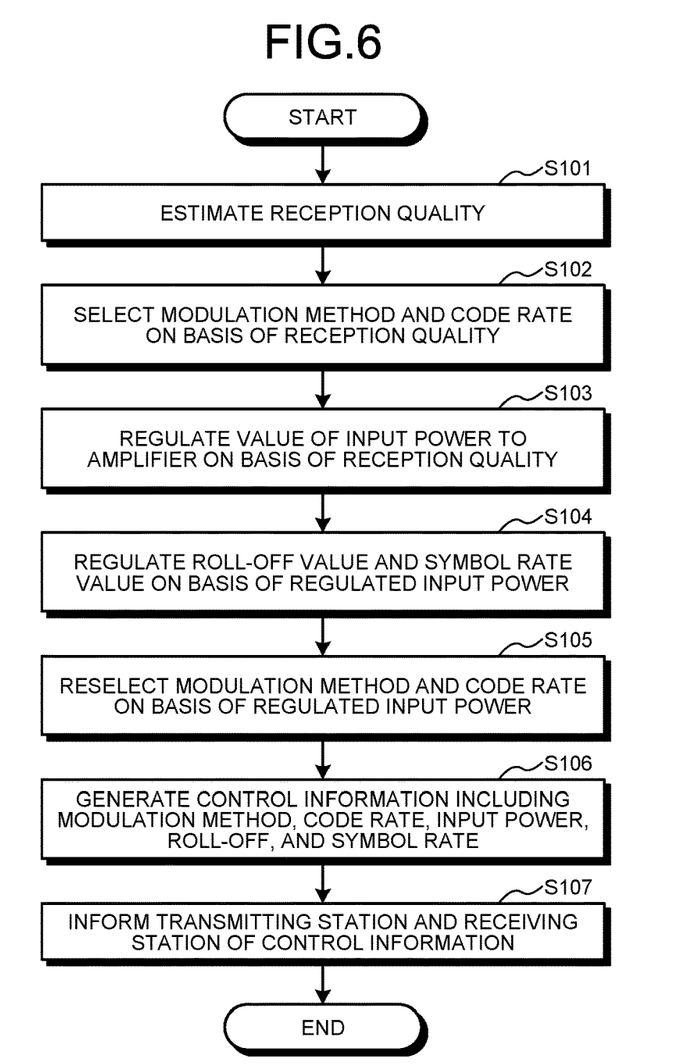
FIG. 6 is a flowchart illustrating an operation of the control station illustrated in FIG. 4.

Next, the method in which the transmission controller unit 303 generates the control information is described in detail. FIG. 6 is a flowchart illustrating an operation of the control station 300 illustrated in FIG. 4. In this example, an elevation angle is used as the estimation value of the reception quality.

The reception quality estimator unit 302 of the control station 300 estimates the reception quality that is a signal quality when the transmitting signal transmitted by the transmitting station 100 is received by the receiving station 200 (step S101). The transmission controller unit 303 selects a modulation method and a code rate on the basis of the estimated reception quality (step S102).

Figure 7:
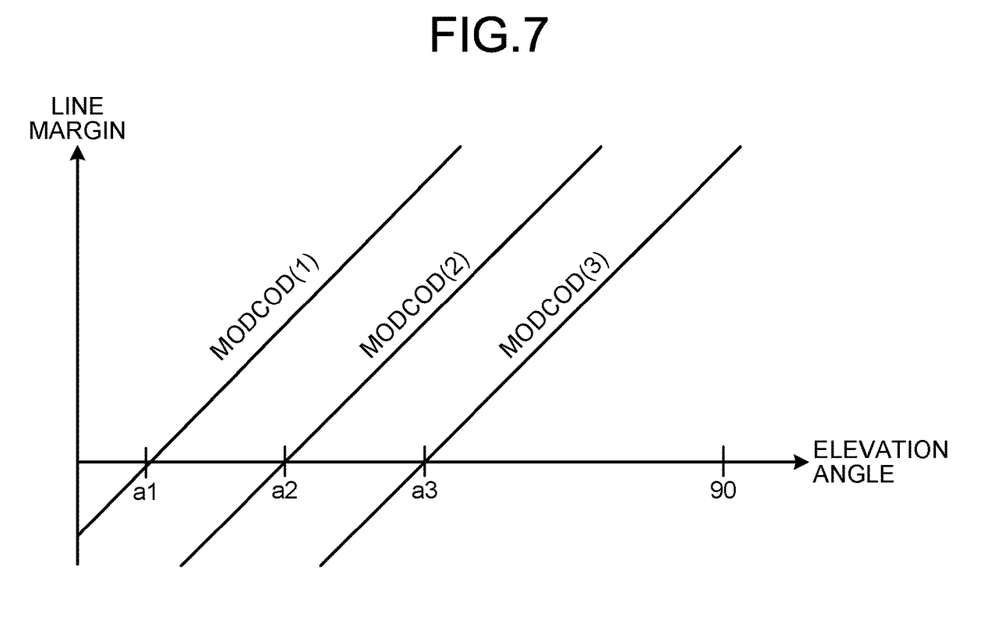
FIG. 7 is a chart illustrating a relationship between an elevation angle between the transmitting station and the receiving station that are illustrated in FIG. 1 and a line margin corresponding to a combination of a modulation method and a code rate.

FIG. 7 is a chart illustrating a relationship between the elevation angle between the transmitting station 100 and the receiving station 200 that are illustrated in FIG. 1, and a line margin corresponding to a combination of the modulation method and the code rate. A horizontal axis of FIG. 7 represents the elevation angle between the transmitting station 100 and the receiving station 200, while a vertical axis of FIG. 7 represents the line margin. The line margin is a difference between the required value of the reception quality that is required to satisfy the desired error rate and the estimation value of the reception quality at each elevation angle. This means that the desired error rate is satisfied if the line margin is positive, and the desired error rate is not satisfied if the line margin is negative. The higher the elevation angle is, the lower the distance attenuation and the rainfall attenuation are. Therefore, when the transmission power of the transmitting station 100 is constant, the higher the elevation angle is, the more increased the line margin is.

In FIG. 7, MODCOD denotes a combination of the modulation method and the code rate, and the larger a suffixed number is, the higher the number of multiple values for modulation and the code rate are. In other words, the larger the number is, the higher the required value of the reception quality is. The transmission controller unit 303 selects a combination of the modulation method and the code rate which brings about a positive line margin and high frequency usage efficiency.

For example, when the elevation angle is between a1 and a2, the transmission controller unit 303 selects MODCOD (1). When the elevation angle is between a2 and a3, the transmission controller unit 303 selects MODCOD (2). When the elevation angle is more than or equal to a3, the transmission controller unit 303 selects MODCOD (3).

A return is made to the explanation of FIG. 6. After selecting the modulation method and the code rate, the transmission controller unit 303 regulates a value of the input power to the amplifier unit 108 of the transmitting station 100 on the basis of the reception quality (step S103).

Figure 8:
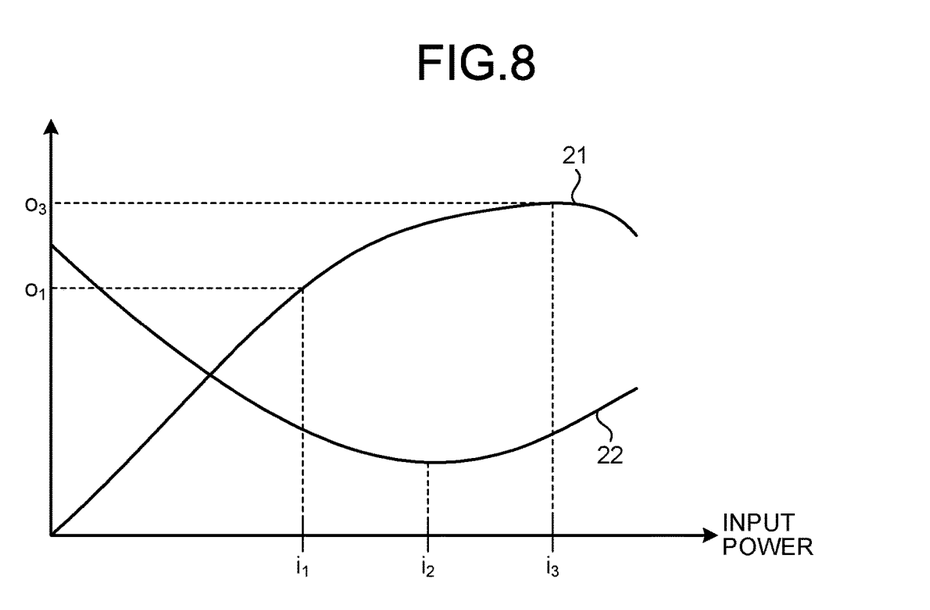
FIG. 8 is a chart illustrating a relationship between an input power to an amplifier unit of the transmitting station illustrated in FIG. 2, and an output power from the amplifier unit and a modulation accuracy of a radio signal outputted from a transmitting antenna.

FIG. 8 is a chart illustrating a relationship between the input power to the amplifier unit 108 of the transmitting station 100 illustrated in FIG. 2, and an output power 21 from the amplifier unit 108 and a modulation accuracy 22 of a radio signal outputted from the transmitting antenna 109.

A horizontal axis of FIG. 8 represents the input power to the amplifier unit 108, while a vertical axis of FIG. 8 represents the output power 21 from the amplifier unit 108 or the modulation accuracy 22 of the radio signal outputted from the transmitting antenna 109. The amplifier unit 108 shows a linear amplifying characteristic or a non-linear amplifying characteristic, depending on the input power value. In the example of FIG. 8, the relationship between the input power to the amplifier unit 108 and the output power from the amplifier unit 108 is linear until the input power value is i1, and the input power is amplified by a constant gain α. When the value of the input power to the amplifier unit 108 is i1, a value of the output power is $o_1$. If the input power value is larger than i1, the relationship between the input power and the output power becomes non-linear. When the input power value is i3, the output is saturated, and the input power is amplified with a gain smaller than α, whereby the output power value becomes $o_3$.

Therefore, when the estimation value of the reception quality is more than or equal to a predetermined threshold, the line margin becomes excessive as illustrated in FIG. 7, so that the transmission controller unit 303 selects an input power value at which the amplifying characteristic of the amplifier unit 108 becomes linear. When the estimation value of the reception quality is less than the predetermined threshold, high output is required, and so the transmission controller unit 303 selects an input power value at which the amplifying characteristic of the amplifier unit 108 becomes non-linear.

A return is made to the explanation of FIG. 6. After regulating the input power value, the transmission controller unit 303 seamlessly adjusts a value of the roll-off of the waveform shaper unit 105 and a value of the symbol rate on the basis of the regulated input power (step S104).

When the input power value is selected such that the amplifying characteristic of the amplifier unit 108 is non-linear, harmonics are caused by signal distortion. In response, the transmission controller unit 303 increases the roll-off, and in order to prevent interference to the outside of the band assigned to the system 1, the transmission controller unit 303 decreases the symbol rate. When the input power value is selected such that the amplifying characteristic of the amplifier unit 108 is linear, the signal distortion is reduced. In response, the transmission controller unit 303 makes the roll-off smaller than when the amplifying characteristic is non-linear, and increases the symbol rate.

Figure 9:
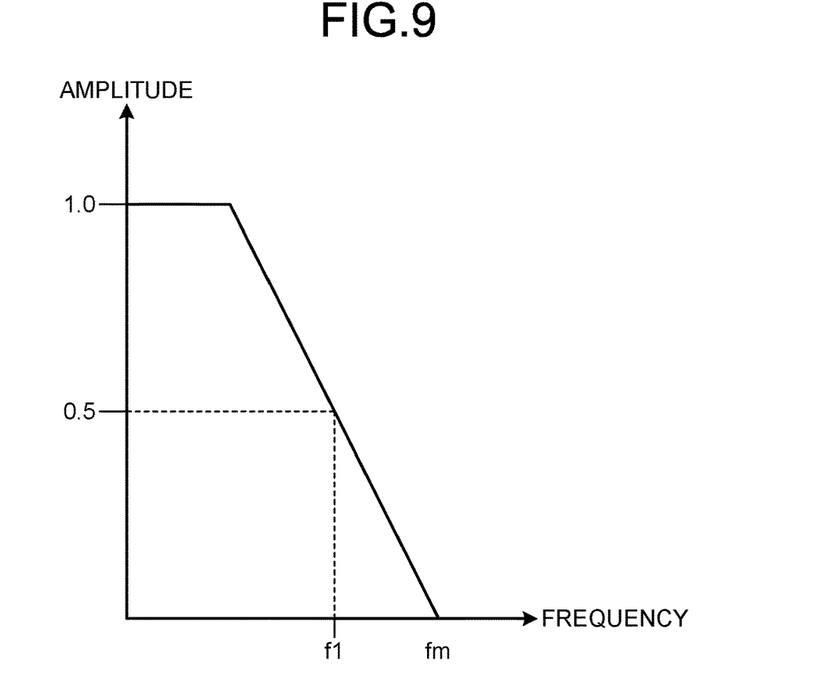
FIG. 9 is a chart illustrating a first example of a filter characteristic of a waveform shaper unit illustrated in FIG. 2.
Figure 10:
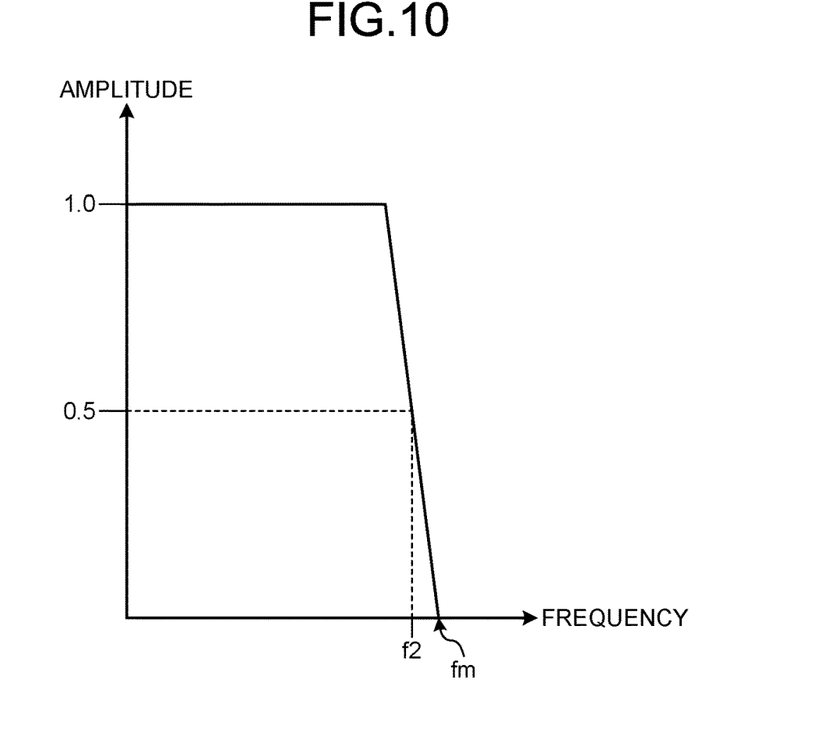
FIG. 10 is a chart illustrating a second example of the filter characteristic of the waveform shaper unit illustrated in FIG. 2.

FIG. 9 is a chart illustrating a first example of the filter characteristic of the waveform shaper unit 105 illustrated in FIG. 2. When the amplifying characteristic of the amplifier 108 is non-linear, the transmission controller unit 303 can specify a roll-off such that the waveform shaper unit 105 has a filter characteristic as illustrated in FIG. 9. FIG. 10 is a chart illustrating a second example of the filter characteristic of the waveform shaper unit 105 illustrated in FIG. 2. When the amplifying characteristic of the amplifier unit 108 is linear, the transmission controller unit 303 can specify a roll-off such that the waveform shaper unit 105 has a filter characteristic as illustrated in FIG. 10. It is to be noted here that even if the roll-off changes, values for stopband fm are equal.

A return is made to the explanation of FIG. 6. The transmission controller unit 303 reselects a modulation method and a code rate on the basis of the adjusted input power (step S105). If the distortion components are reduced after the adjustment of the input power, that is to say, if the amplifying characteristic of the amplifier unit 108 becomes linear, the transmission controller unit 303 can also reselect the modulation method and the code rate such that the number of multiple values for modulation and the code rate are even higher to satisfy the desired error rate. It is to be noted that step S105 may be omitted.

The transmission controller unit 303 generates control information including the above selected or regulated/adjusted information elements such as the modulation method, the code rate, the input power, the roll-off, and the symbol rate (step S106). The control information transmit and receive unit 304 informs the transmitting station 100 and the receiving station 200 of the generated control information (step S107).

In the above example, the control information is transmitted from the control station 300 to the transmitting station 100 and the receiving station 200. However, the control information to be communicated to the receiving station 200 may be transmitted via the transmitting station 100 in order for a timing of changing the information element specified to each of the units of the transmitting station 100 to match with a timing of changing the information element specified to each of the units of the receiving station 200. In this case, the receiving station 200 demodulates a data part of the transmitted data, corresponding to the control information in advance to obtain the control information, and thereafter demodulates a data part other than the control information, namely, a data part outputted from the transmission buffer 102. With such a configuration, transmission processing in the transmitting station 100 and reception processing in the receiving station 200 can be synchronized.

As described above, the frequency of the transmitting signal and the input power to the amplifier unit 108 are regulated based on the estimation value of the reception quality in the first embodiment of the present invention. With such a configuration, on the basis of the estimation value of the reception quality, the transmitting station 100 can achieve the appropriate frequency usage efficiency to obtain the desired error rate and can reduce the signal distortion by preventing the transmission power from being excessive, and furthermore, even when the signal distortion is caused, the transmitting station 100 can minimize deterioration in reception quality. Therefore, the frequency usage efficiency and power utilization efficiency can both be improved, and high-speed data transmission can be achieved.

According to the first embodiment described above, the symbol rate and the roll-off are adjusted based on the estimation value of the reception quality. Specifically, in the case where the input power determined based on the estimation value of the reception quality is used, when the amplifying characteristic of the amplifier unit 108 becomes non-linear to cause distortion in a signal, the roll-off is increased so that the waveform shaper unit 105 can cut off the harmonics that are caused by the signal distortion thereby minimizing the deterioration in reception quality. At this time, if the symbol rate is decreased, the interference to the outside of the band assigned to the data transmission system 1 can be prevented.

In the above embodiment, in cases where the transmitting station 100 performs polarization multiplexing or frequency multiplexing, contents of data to be multiplexed may be changed based on the elevation angle, that is to say, based on the estimation value of the reception quality. When the estimation value of the reception quality is less than the predetermined threshold, identical data sets may be multiplexed by use of the polarization multiplexing or the frequency multiplexing, or identical data sets may be multiplexed using space time block coding (STBC). Such a configuration enables data to be reliably transmitted. When the estimation value of the reception quality is higher than or equal to the predetermined threshold, different data sets are multiplexed. With such a configuration, data transmission efficiency can be improved.

Second Embodiment

In the second embodiment of the present invention, description is provided for a configuration in which two or more radio signals are simultaneously transmitted in order to achieve a wider bandwidth of radio communication. In the second embodiment, the overall configuration of the data transmission system 1 is similar to the configuration of the first embodiment except for use of a transmitting station 400, which is described below, in place of the transmitting station 100 illustrated in FIG. 1 and some of the operations of the control station 300. Therefore, the overall configuration of the data transmission system 1 is not described here. The following description is mainly of differences from the first embodiment.

Figure 11:
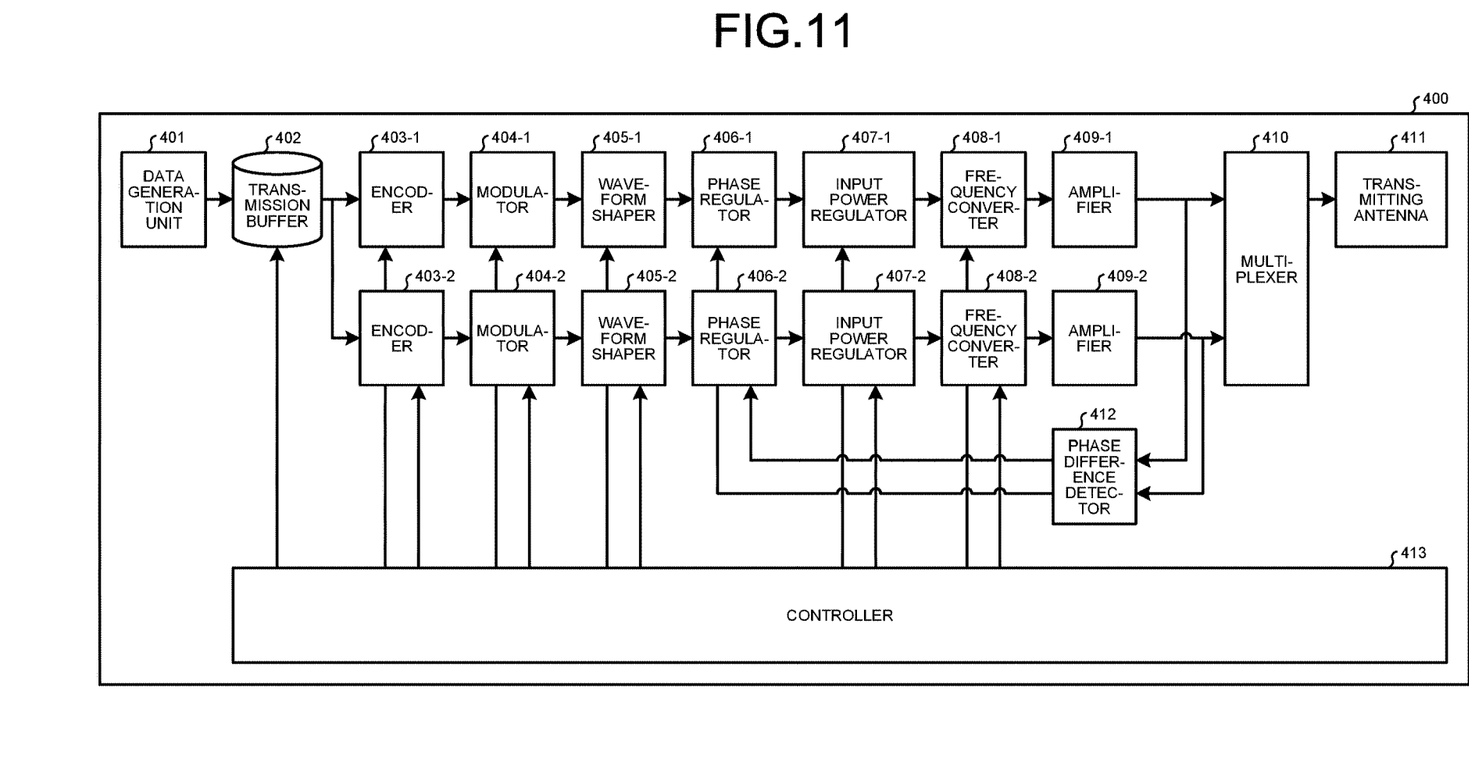
FIG. 11 is a diagram illustrating a functional configuration of a transmitting station according to a second embodiment of the present invention.

FIG. 11 is a diagram illustrating a functional configuration of the transmitting station 400 according to the second embodiment of the present invention. In FIG. 11 and in the following description, where the transmitting station 400 includes two or more constituent elements having the same name, the two or more constituent elements each have a hyphen and a number suffixed after a symbol in order for the constituent elements to be distinguished. When the constituent elements need not be distinguished, the hyphen and the number suffixed after the symbol are omitted for representation thereof. For example, when an encoder unit 403-1 and an encoder unit 403-2 need not be distinguished, each of these units is simply referred to as encoder unit 403.

The transmitting station 400 includes a data generation unit 401, a transmission buffer 402, the encoder unit 403-1 and encoder unit 403-2, modulator unit 404-1 and modulator unit 404-2, waveform shaper unit 405-1 and waveform shaper unit 405-2, and phase regulator unit 406-1 and phase regulator unit 406-2. The transmitting station 400 further includes input power regulator unit 407-1 and input power regulator unit 407-2, frequency converter unit 408-1 and frequency converter unit 408-2, amplifier unit 409-1 and amplifier unit 409-2, a multiplexer unit 410, a transmitting antenna 411, a phase difference detector unit 412, and a controller unit 413.

In FIG. 11, the number of the constituent elements having the same name is two, but the present invention is not limited to this example. The transmitting station 400 can include three or more constituent elements having the same name. Of the above-mentioned constituent elements, constituent elements other than the phase regulator units 406, the phase difference detector unit 412, and the multiplexer unit 410 having the same functions as the constituent elements having identical names in FIG. 2, and so their detailed description will be omitted.

The data generation unit 401 generates data to be transmitted, such as observation data, and causes the transmission buffer 402 to store the generated data therein. The transmission buffer 402 outputs the stored data to each of the encoder units 403 at a transfer rate specified from the controller unit 413. Each of the encoder units 403 encodes the data outputted from the transmission buffer 402 using an encoding method specified from the controller unit 413. Each of the encoder units 403 outputs the encoded data to each of the modulator units 404.

The modulator units 404 modulate the data sets outputted from the encoder units 403 using modulation methods specified from the controller unit 413, respectively. The modulator units 404 output the modulated data sets to the waveform shaper units 405, respectively. The waveform shaper units 405 shape waveforms of the data sets outputted from the modulator units 404, respectively so that the data sets are band-limited with roll-offs specified from the controller unit 413. The waveform shaper units 405 output the shaped signals to the phase regulator units 406, respectively.

The phase regulator units 406 rotates the phase of the signals outputted from the waveform shaper units 405, respectively on the basis of phase adjustment information pieces sent from the phase difference detector 412 for notification. In such a case, the phase regulator unit 406 performs the phase rotation of the signal so that a phase difference becomes zero between signals outputted respectively by the amplifier units 409. The phase regulator units 406 output the phase-rotated signals to the input power regulator units 407, respectively.

The input power regulator units 407 multiply the signals outputted by the phase regulator units 406, respectively by coefficients specified from the controller unit 413. When the input power regulator units 407 perform multiplication of the coefficients, respectively, powers of signals inputted to the amplifier units 409, respectively, are adjusted. Therefore, each input power regulator unit 407 serves to regulate the input power to the amplifier unit 409. The input power regulator units 407 output the signals obtained after the input power regulation, to the frequency converter units 408, respectively.

The frequency converter units 408 convert the signals outputted by the input power regulator units 407, respectively into signals in a radio transmission frequency band using frequency conversion amounts specified from the controller unit 413, respectively. The frequency converter units 408 output the signals obtained by the conversion to the amplifier units 409, respectively.

The amplifier units 409 amplify the signals outputted by the frequency converter units 408, respectively. The amplifier units 409 output the amplified signals to each of the multiplexer unit 410 and the phase difference detector unit 412.

The multiplexer unit 410 multiplexes the signals outputted respectively from the amplifier units 409 to obtain a radio signal and transmits the radio signal to the receiving station 200 via the transmitting antenna 411. The phase difference detector unit 412 detects a phase difference between the signals outputted by the amplifier units 409 and generates phase adjustment information reflecting the detected phase difference. The phase difference detector unit 412 informs each of the phase regulator units 406 of the generated phase adjustment information. Here the phase adjustment information is set such that the phase difference becomes zero. The controller unit 413 specifies the information elements respectively to the transmission buffer 402, the encoder units 403, the modulator units 404, the waveform shaper units 405, the input power regulator units 407, and the frequency converter units 408 on the basis of the control information to control operations of these units.

Figure 12:
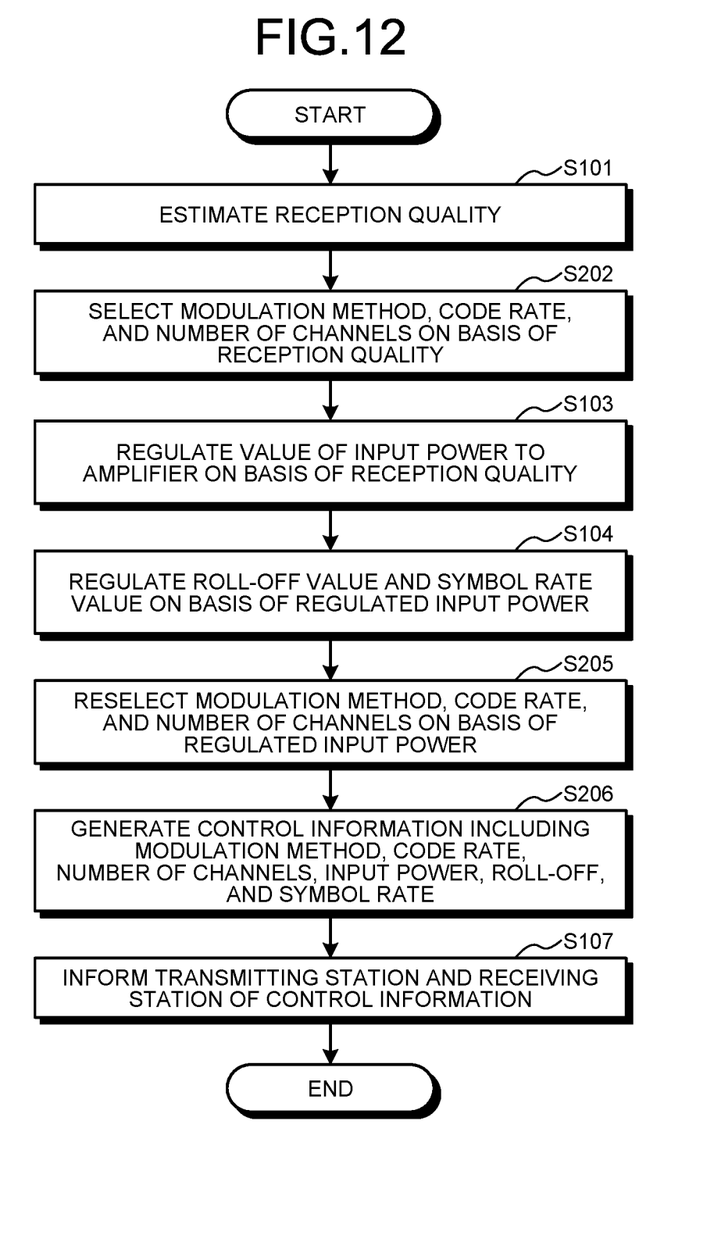
FIG. 12 is a flowchart illustrating an operation of a control station according to the second embodiment of the present invention.

A description is provided next of the operation of the control station 300. FIG. 12 is a flowchart illustrating the operation of the control station 300 according to the second embodiment of the present invention. Operations similar to those in the first embodiment have the same reference characters and are not described. The following description is mainly of operations different from the operations in the first embodiment illustrated in FIG. 6.

The transmission controller unit 303 of the control station 300 selects a modulation method, a code rate and the number of channels on the basis of the estimated reception quality (step S202). The number of channels is the number of signals to be multiplexed in a frequency domain by the multiplexer unit 410. When the multiplexer unit 410 multiplexes only an output of the amplifier unit 409-1, the number of channels is one. When the signals outputted by the amplifier units 409-1 and 409-2 are signals obtained by converting different data sets into different frequencies, the number of channels is two. The transmission controller unit 303 reselects a modulation method, a code rate, and the number of channels on the basis of the regulated input power (step S205). The transmission controller unit 303 generates control information including the modulation method, the code rate, the number of channels, the input power, the roll-off, and the symbol rate (S206).

Figure 13:
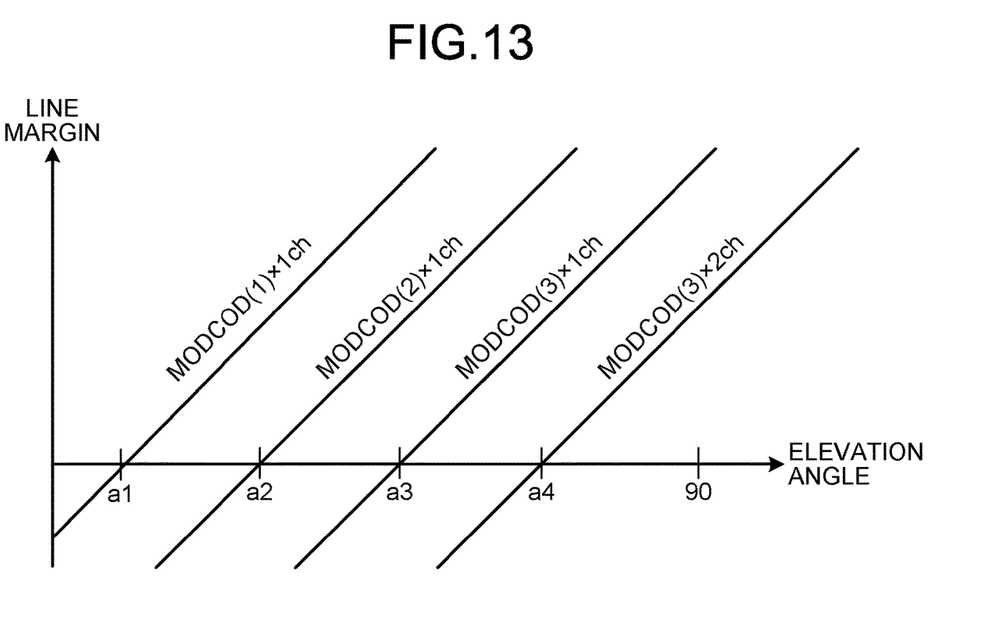
FIG. 13 is a chart illustrating a relationship between an elevation angle between the transmitting station illustrated in FIG. 11 and the receiving station illustrated in FIG. 1, and a line margin corresponding to a combination of a modulation method, a code rate, and the number of channels.

FIG. 13 is a chart illustrating a relationship between an elevation angle between the transmitting station 400 illustrated in FIG. 11 and the receiving station 200 illustrated in FIG. 1, and a line margin corresponding to a combination of the modulation method, the code rate, and the number of channels. A horizontal axis of FIG. 13 represents the elevation angle, while a vertical axis thereof represents the line margin. The transmission controller unit 303 can set the number of channels to two when the elevation angle is more than or equal to a4.

In the above description, the multiplexer unit 410 multiplexes the different data sets with different frequencies, but the present invention is not limited to this example. If the estimation value of the reception quality is less than a threshold, the multiplexer unit 410 may multiplex identical data sets. In such a case, the multiplexer unit 410 can multiplex the identical data sets with different frequencies. In this case, the receiving station 200 can improve the reception quality by adding up the identical data sets received at the different frequencies. The multiplexer unit 410 may convert the identical data sets to the same frequency and then multiplex its conversion result. In this case, since the signals outputted respectively by the amplifier units 409-1 and 409-2 are in phase with each other because of the phase regulator units 406, a signal power obtained by the multiplex can be improved as compared with a case where only the output of the amplifier unit 409-1 is transmitted. When the estimation value of the reception quality is higher than or equal to the threshold, the multiplexer unit 410 can multiplex data sets that differ from each other.

Instead of multiplexing the two channels with different frequencies, the multiplexer unit 410 may separate the two channels into different polarized waves and then multiplex them. The multiplexer unit 410 can perform multiplexing with the output of the amplifier unit 409-1 being regarded as a left-handed circularly polarized wave and with the output of the amplifier unit 409-2 being regarded as a right-handed circularly polarized wave, respectively.

As described above, according to the second embodiment of the invention, the radio communication with a wider bandwidth can be achieved in addition to the effects of the first embodiment.

The above configurations illustrated in the embodiments are illustrative of contents of the present invention, and can be combined with other publicly known techniques and partly omitted and/or modified without departing from the gist of the present invention.

In the above embodiment, the transmitting station 100 is mounted on the satellite, but the present invention is not limited to this example. The technique of the present invention can be applied to a case where the transmitting station 100 is mounted on a mobile object such as an aircraft, whereby the reception quality varies with time.

In the above embodiment, the information element to be specified to each of the units of the transmitting station 100 and the receiving station 200 is included in the control information, but the present invention is not limited to this example. The control information includes the estimation value of the reception quality, and the transmitting station 100 and the receiving station 200 may each determine the information element to be specified to each of the units on the basis of the estimation value of the reception quality. In this case, the transmitting station 100 and the receiving station 200 each prestore correspondence relations between values of the information elements and estimation values of the reception quality and select the value of the information element based on the correspondence relations to specify it to each of the units. Alternatively, the information element may be changed by means of a predetermined change pattern. The transmitting station 100 and the receiving station 200 each prestore the change pattern and can use this change pattern to change, on the basis of a time elapsed since reception of the control information, the information element to be specified to each of the units.

REFERENCE SIGNS LIST

1 data transmission system; 10 control circuit; input unit; 12 processor; 13 memory; 14 output unit; 100, 400 transmitting station; 101, 401 data generation unit; 102, 402 transmission buffer; 103, 403, 403-1, 403-2 encoder unit; 104, 404, 404-1, 404-2 modulator unit; 105, 405, 405-1, 405-2 waveform shaper unit; 106, 407, 407-1, 407-2 input power regulator unit; 107, 408, 408-1, 408-2 frequency converter unit; 108, 409, 409-1, 409-2 amplifier unit; 109, 411 transmitting antenna; 110, 207, 413 controller unit; 200 receiving station; 201 receiving antenna; 202 frequency converter unit; 203 waveform shaper unit; 204 demodulator unit; 205 decoder unit; 206 reception buffer; 300 control station; 301 location management unit; 302 reception quality estimator unit; 303 transmission controller unit; 304 control information transmit and receive unit; 406, 406-1, 406-2 phase regulator unit; 410 multiplexer unit; 412 phase difference detector unit.

The invention claimed is:

1. A transmitting station, comprising:
   an encoder to encode a transmitting signal;
   a modulator to modulate the transmitting signal;
   an amplifier to amplify the transmitting signal;
   a transmitting antenna to wirelessly transmit the transmitting signal that has been amplified; and
   a controller to regulate a frequency of the transmitting signal, an input power to the amplifier, and at least one of the number of multiple values for modulation of a modulation method to be specified to the modulator and a code rate to be specified to the encoder on the basis of an estimation value of reception quality that is a signal quality when the transmitting signal is received by a receiving station,
   wherein: the controller regulates the input power on the basis of the estimation value of the reception quality to regulate the amplifier to have a linear or non-linear amplifying characteristic; and the controller increases one of the number of multiple values for modulation and the code rate when regulating the input power to a value that brings about the linear amplifying characteristic.

2. A control circuit to control a transmitting station, the transmitting station comprising:
   an encoder to encode a transmitting signal;
   a modulator to modulate the transmitting signal;
   an amplifier to amplify the transmitting signal; and a transmitting antenna to wirelessly transmit the transmitting signal that has been amplified,
wherein the control circuit causes the transmitting station to execute processes of:
regulating a frequency of the transmitting signal, an input power to the amplifier, and at least one of the number of multiple values for modulation of a modulation method to be specified to the modulator and a code rate to be specified to the encoder on the basis of an estimation value of reception quality that is a signal quality when the transmitting signal is received by a receiving station;
regulating the input power on the basis of the estimation value of the reception quality to regulate the amplifier to have a linear or non-linear amplifying characteristic; and
increasing one of the number of multiple values for modulation and the code rate when regulating the input power to a value that brings about the linear amplifying characteristic.

3. A non-transitory storage medium having a program stored therein configured to control a transmitting station the program configured to control the transmitting station comprising:

an encoder to encode a transmitting signal;
a modulator to modulate the transmitting signal;
an amplifier to amplify the transmitting signal; and
a transmitting antenna to wirelessly transmit the transmitting signal that has been amplified,
wherein the program causes the transmitting station to execute processes of:
regulating a frequency of the transmitting signal, an input power to the amplifier, and at least one of the number of multiple values for modulation of a modulation method to be specified to the modulator and a code rate to be specified to the encoder on the basis of an estimation value of reception quality that is a signal quality when the transmitting signal is received by a receiving station;
regulating the input power on the basis of the estimation value of the reception quality to regulate the amplifier to have a linear or non-linear amplifying characteristic; and
increasing one of the number of multiple values for modulation and the code rate when regulating the input power to a value that brings about the linear amplifying characteristic.

* * * * *